United States Patent
Kirk et al.

(10) Patent No.: US 8,548,980 B2
(45) Date of Patent: Oct. 1, 2013

(54) ACCELERATING QUERIES BASED ON EXACT KNOWLEDGE OF SPECIFIC ROWS SATISFYING LOCAL CONDITIONS

(75) Inventors: Steven A. Kirk, Chelmsford, MA (US); David E. Walrath, Stow, MA (US)

(73) Assignee: Sybase Inc., Dublin, CA (US)

( * ) Notice: Subject to any disclaimer, the term of this patent is extended or adjusted under 35 U.S.C. 154(b) by 242 days.

(21) Appl. No.: 11/966,611

(22) Filed: Dec. 28, 2007

(65) Prior Publication Data

US 2009/0171921 A1    Jul. 2, 2009

(51) Int. Cl.
*G06F 7/00* (2006.01)
*G06F 17/30* (2006.01)

(52) U.S. Cl.
USPC .......................................... 707/713; 707/802

(58) Field of Classification Search
None
See application file for complete search history.

(56) References Cited

U.S. PATENT DOCUMENTS

| 6,439,783 | B1 * | 8/2002 | Antoshenkov | 1/1 |
| 6,691,101 | B2 * | 2/2004 | MacNicol et al. | 707/714 |
| 2005/0097078 | A1 * | 5/2005 | Lohman et al. | 707/2 |
| 2005/0149472 | A1 * | 7/2005 | Schreter | 707/1 |
| 2006/0235818 | A1 * | 10/2006 | Muras | 707/1 |

OTHER PUBLICATIONS

M. Astrahan et al., "*System R: Relational Approach to Database Management*," ACM Transactions on Database Systems, vol. 1, issue 2, (Jun. 1976), pp. 97-137.

* cited by examiner

*Primary Examiner* — Loan T Nguyen
(74) *Attorney, Agent, or Firm* — Sterne, Kessler, Goldstein & Fox P.L.L.C.

(57) ABSTRACT

A method, computer program product, and system are provided for accelerating a query in a database system. For example, an embodiment of the method may include generating a data structure identifying a set of rows that satisfy conditions local to a table prior to an evaluation of a query and modifying the query based on the data structure. In addition, the method may include repeating the steps with respect to generating the data structure and modifying the query, if one or more additional local conditions are inferred from modifying the query based on the data structure.

19 Claims, 7 Drawing Sheets

| Employee Name | Age | Years of Service |
|---|---|---|
| Smith | 36 | 12 |
| Anderson | 25 | 1 |
| Johnson | 25 | 3 |
| Davis | 39 | 15 |
| Baldwin | 45 | 4 |
| Miller | 25 | 3 |
| Fish | 35 | 4 |
| Young | 55 | 23 |

| Employee Name | Department ID | Department Name | |
|---|---|---|---|
| Smith | 24 | Engineering | ← 541 |
| Anderson | 23 | Clerical | ← 542 |
| Johnson | 24 | Engineering | ← 543 |
| Davis | 21 | Marketing | ← 544 |
| Baldwin | 21 | Marketing | ← 545 |
| Miller | 23 | Clerical | ← 546 |
| Fish | 23 | Clerical | ← 547 |
| Young | 24 | Engineering | ← 548 |

| Employee Name | Age | Years of Service |
|---|---|---|
| Anderson | 25 | 1 |
| Johnson | 25 | 3 |
| Miller | 25 | 3 |

ACCELERATING QUERIES BASED ON EXACT KNOWLEDGE OF SPECIFIC ROWS SATISFYING LOCAL CONDITIONS

BACKGROUND

1. Field

The present invention relates generally to databases and, more particularly, to query optimization in a database.

2. Background

Databases commonly organize data in the form of tables, where each table has a number of rows and columns. Each row in the table generally has a data value associated with each of the columns, where this intersection of a row and a column is commonly referred to as a cell. A system needing access to data in the database typically issues a request in the form of a query. The query usually involves a request for the data contained in one or more cells of any rows which meet a specific set of conditions. Such a condition often involves the comparison of the values of cells in a column to some other value to determine whether the row associated with the compared cell meets that condition. Conditions can be divided into two categories: local conditions and non-local conditions. Local conditions are those that are associated with a single table because any column referenced within the condition is from one table (e.g., "TABLE1.COLUMN1=100" and "TABLE1.COLUMN1=TABLE1.COLUMN2+1"). Non-local conditions are referred to as one of the following: join conditions (i.e., columns from multiple tables); having conditions (i.e., aggregate functions); or, prefilter conditions (i.e., no columns).

Traditionally, in performing a query, modern database management systems ("DBMSs") translate declarative Structured Query Language ("SQL") statements into an executable plan, also known as a Query Execution Plan ("QEP"), prior to the actual execution of the query. In a SQL DBMS, a number of methods are available to execute a given query, where each method varies in performance and resource consumption. A query optimizer evaluates these methods and attempts to determine the most efficient way to perform the query.

In a query involving two or more tables, the performance of a QEP is often determined largely by the order in which the tables are joined. For example, when joining tables A, B, and C of size 10 rows, 100 rows, and 1,000 rows, respectively, a QEP that joins tables A and C first may take more time to execute than one that executes B and C first. More specifically, a query optimizer computes all plausible methods to access tables A, B, and C. For each table, the optimizer estimates the least expensive way to access that table, evaluates local condition associated with that table, and keeps track of any associated sort order among the records. The optimizer then considers the join algorithms available to the SQL DBMS to generate a two-table QEP for the combination of each pair of tables (i.e., combination of tables A and B, combination of tables B and C, and combination of tables A and C). The optimizer estimates the least expensive way to join each pair of tables, as well as the least expensive way to join each pair of tables to generate an output according to a particular sort order. Based on this information, a three-table QEP is computed by joining each two-table QEP with the remaining table in the query (e.g., a two-table QEP containing tables A and C may be joined with table B to form a three-table QEP). As a result, three QEPs may be generated for tables A, B, and C, where each QEP includes a specific join order and the join algorithm for each join. The query optimizer then chooses one of the join algorithms to perform the actual query.

In choosing a join algorithm, the query optimizer bases its determination on a cost model. The cost model is a mathematical model that determines an estimate of the execution cost of the algorithm (e.g., I/O costs, CPU costs, and communication costs). Accurate cost estimation requires an accurate estimation of cardinalities of each processing step in the query, where a cardinality refers to a count of a number of rows that participate in the executed query step. In conventional methods, cardinalities are estimated based on statistical methods applied to data in a database. The statistical information is typically gathered by executing special purpose queries, which read all or part of a database table, performing an analysis on the special purpose queries, and storing the results of the analysis for later use by a query optimizer. Oftentimes, the statistical information is under- or over-inclusive with respect to a particular query, yielding inaccurate results. Alternatively, the estimates may come from information stored in auxiliary data structures referred to as indexes. For complex queries involving several tables and conditions, cardinality estimation using these methods may be highly inaccurate such that the query optimizer chooses an inefficient join algorithm or join order, resulting in a long query execution time and an inefficient use of computing resources. Once a sub-optimal join algorithm is chosen for a query, it is very difficult to modify the algorithm during query execution.

Accordingly, what is desired is a more accurate means of estimating cardinality such that a query optimizer chooses an more efficient QEP.

SUMMARY

Embodiments of the invention include a method for accelerating a query in a database system. The method may include generating a data structure identifying a set of rows that satisfy conditions local to a table prior to an evaluation of a query and modifying the query based on the data structure. In addition, the method may include repeating the steps with respect to generating the data structure and modifying the query, if one or more additional local conditions are inferred from modifying the query based on the data structure, until no additional local conditions may be inferred or until no additional local conditions may be inferred with respect to a cost analysis of the local condition. When generating the data structure identifying the set rows that satisfies conditions local to the table, indexes or cell values of the table may be used during an evaluation of local conditions.

In modifying the query based on the data structure, three data structures may be generated: (1) a data structure identifying no rows that satisfy the local conditions; (2) a data structure identifying exactly one row that satisfies the local conditions and contents of cell values of that one row; and, (3) a data structure identifying a moderate number of rows that satisfy the local conditions and contents of cell values of the moderate number of rows. In the data structure identifying no rows that satisfy the local conditions, a false prefilter condition may be inferred, where this condition may be migrated as high as possible within the query. An elimination of one or more tables from the query may also occur in the instance where no rows satisfy the local conditions. In the data structure identifying exactly one row that satisfies the local conditions, occurrences of columns from the table may be replaced with values of corresponding cell values. In the data structure identifying the moderate number of rows, an IN condition may be inferred when a column from the table is used within a join condition. The inference of the IN condition may be used as long as a benefit of inferring one or more conditions exceeds an added cost of the one or more conditions.

Embodiments of the invention additionally include a computer program product comprising a computer-usable medium having computer program logic recorded thereon for enabling a processor to accelerate a query in a database system. The computer program logic includes a generating means for enabling the processor to generate a data structure identifying a set of rows that satisfy conditions local to a table prior to an evaluation of a query and a modifying means for enabling a processor to modify the query based on the data structure. In addition, the computer program logic may also include a repeating means for enabling a processor to repeat the generating means and the modifying means, if one or more additional local conditions are inferred from the modifying means, until no additional local conditions may be inferred or until no additional local conditions may be inferred with respect to a cost analysis of the local condition.

Embodiments of the invention further include a system capable of accelerating a query in a database system. The system may include a first module to generate a data structure identifying a set of rows that satisfy conditions local to a table prior to an evaluation of a query and a second module to modify the query based on the data structure. In addition, the system may include a third module to re-generate the data structure and re-modify the query, if one or more additional local conditions are inferred from the modification of the query, until no additional local conditions may be inferred or until no additional local conditions may be inferred with respect to a cost analysis of the local conditions.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Embodiments of the present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In conventional query optimization methods, cardinalities are generally estimated based on statistical information about data stored in a database. When statistics are used in cardinality estimation, errors increase as estimations are performed on top of another, such that after several estimations, the estimated cardinality may be highly inaccurate. In addition, standard constructs are used in the estimation process that cannot be based on statistical information. The standard approach is to use a "guess" or "magic number" when such constructs are encountered in the cardinality estimation process. Consequently, these constructs add to the inaccuracy of cardinality estimation.

As queries are performed on tables with a large number of rows, the accuracy of cardinality estimation becomes a greater issue. Inaccurate cardinality estimation may lead to non-linear increases in execution time of the query, resulting in an inefficient use of computing resources. By estimating cardinalities based on the actual effect of local conditions, more accurate cardinality estimation may be performed such that a query optimizer is more likely to choose the most efficient join algorithm to execute a query.

Figure 1:
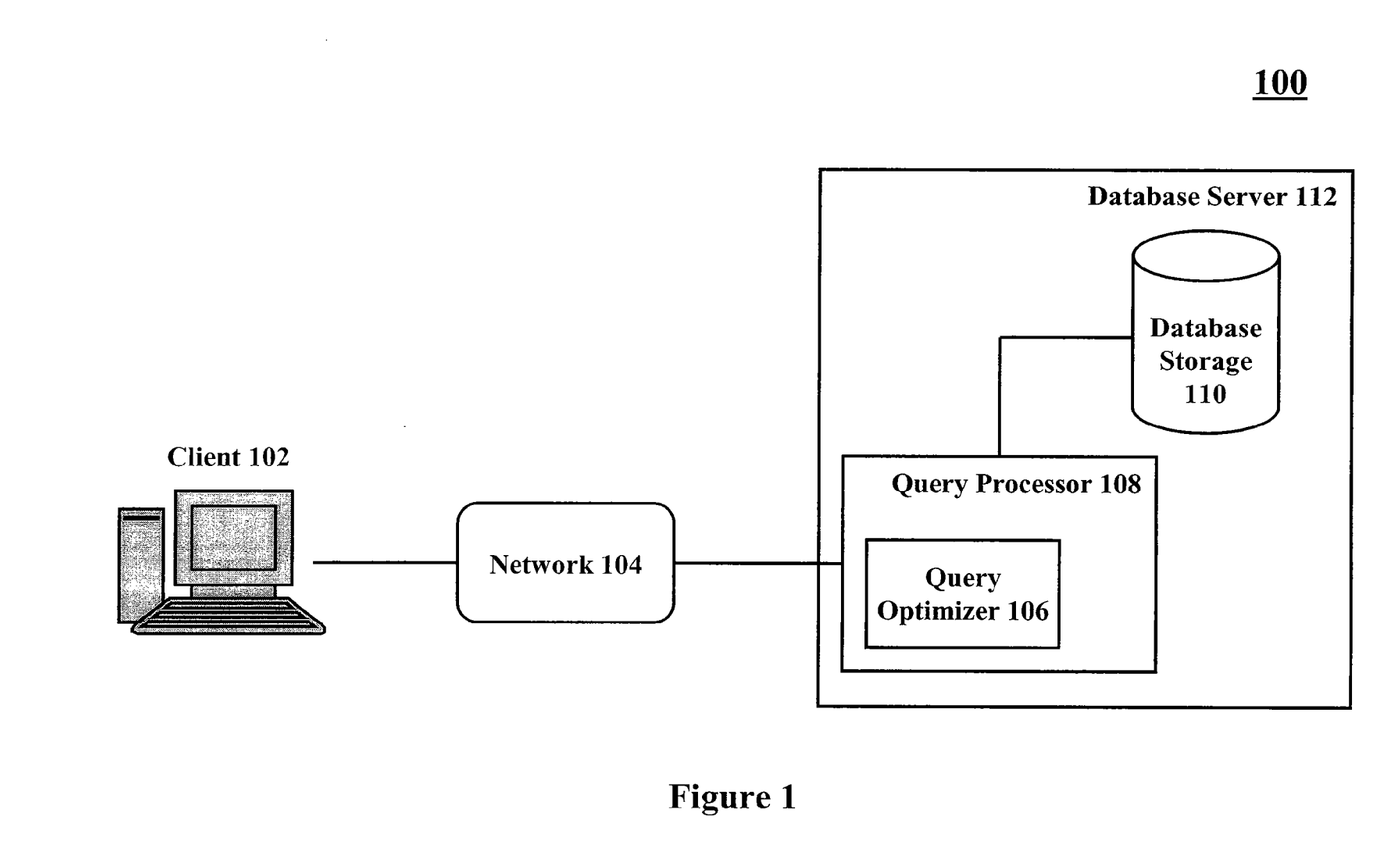
FIG. 1 illustrates an embodiment of a database network in which the present invention may be implemented.

FIG. 1 depicts a database network 100 in which the present invention may be implemented, in accordance with an embodiment of the present invention. The database network 100 includes a client system 102, a network 104, and a database server 112. Database server 112 includes a query processor 108 and a database storage 110.

Client system 102 may send a request for data, commonly in the form of a database query, to database server 112 over network 104. Database server 112 replies to the request by sending a set of results, commonly in the form of result rows from a database table, to client system 102 over network 104. One skilled in the relevant art will appreciate that any data format operable to convey a request for data and a reply to the request may be used. Further, one skilled in the relevant art will also appreciate that a user may be connected directly to database server 112 while database server 112 is running. In an embodiment of the present invention, the requests and replies are consistent with the conventions used in SQL, although this example is provided solely for purposes of illustration and not limitation.

Network 104 is optionally either a public or private communications network. In an embodiment of the present invention, network 104 may be the Internet. In an additional embodiment of the present invention, network 104 may be a private intranet, such as a corporate network.

When a request for data, such as a query, is received by database server 112, it is handled by query processor 108, in accordance with an embodiment of the present invention. Query processor 108 includes a query optimizer 106. Query optimizer 106 determines an optimal QEP for query processor 108 to execute the query. Query processor 108 determines the data requested by the query, obtains the data, and provides a reply to the query. One skilled in the relevant art will appreciate that query processor 108 may be implemented in a number of ways in order to accomplish the same function, including separating each of the aforementioned operations performed by query processor 108 into individual modules.

Accordingly, the illustration of modules in database server 112 is not a limitation on the implementation of database server 112.

In an embodiment of the present invention, query processor 108 obtains the data, in response to the query, from database storage 110. Database storage 110 stores values of a database in a set of data structures. In an embodiment of the present invention, database values are stored in a table data structure, where the table has data rows and columns. At the intersection of each row and column is a data cell, where the data cell has access to a data value corresponding to the associated row and column. Each column, according to an embodiment of the present invention, has an associated data type, such as a "string" or an "integer," which may be used by query processor 108 and client system 102 to interpret data contained in a data cell corresponding to the column. In an embodiment of the present invention, database storage 110 may contain one or more tables.

Additionally, database storage 110 comprises an alternate means of indexing data stored in a table of a database, according to an embodiment of the present invention. Query processor 108 may analyze a query to determine whether an available alternate means is useful to optimally access the data stored in a table. Query processor 108 may then utilize this alternate means to obtain data from the table. The present invention may be used in conjunction with this alternate means of indexing data stored in the database table, although the alternate means of invoking the algorithms disclosed herein, in order to access data within the database, are known to those in the relevant art and, therefore, within the scope of the present invention.

Figure 2:
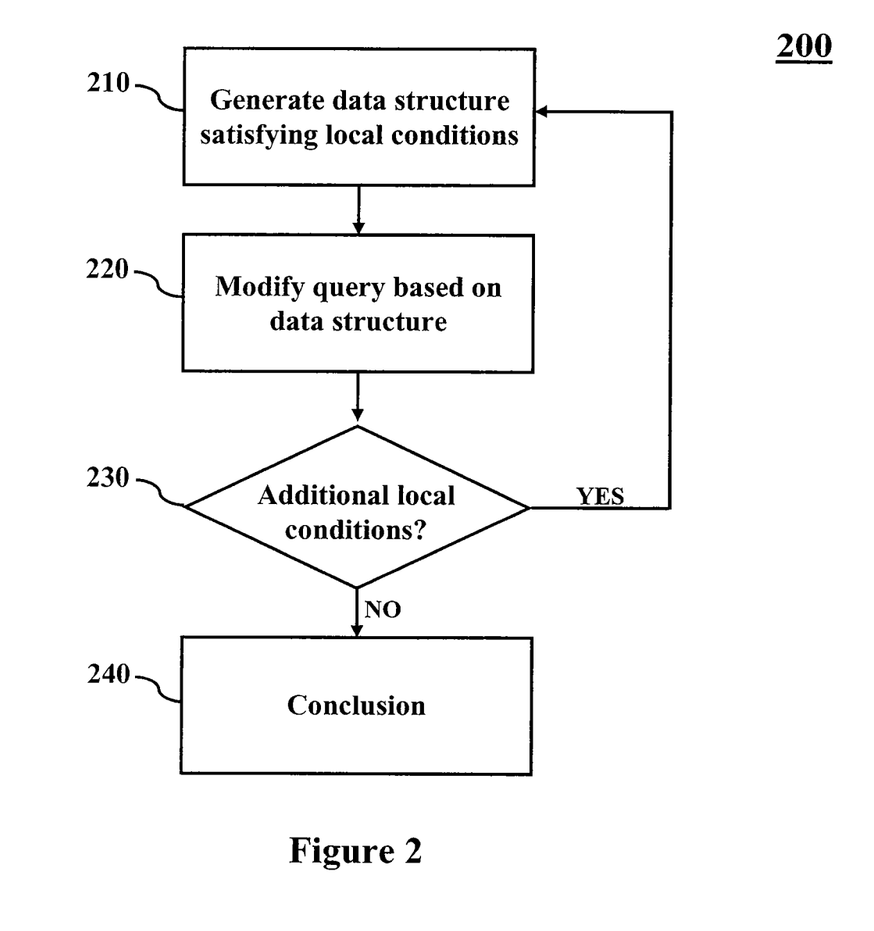
FIG. 2 illustrates an embodiment of a method for accelerating queries.

FIG. 2 illustrates an embodiment of a method 200 to accelerate a query in a database system. Method 200 may occur using, for example, database network 100. In step 210, a data structure is generated that identifies a specific set of rows that satisfy local conditions, prior to an evaluation of a query, for each table of the query. In step 220, the query is modified based on the data structure. For example, when the data structure identifies exactly one result row, then all occurrences of columns from the rest of that table may be replaced by corresponding cell values from the one result row. In another example, additional conditions may be inferred, when appropriate, from the set of rows identified in the data structure. In step 230, if step 220 results in a creation of additional local conditions, then steps 210 and 220 may be repeated, if appropriate; otherwise, method 200 concludes with step 240.

Figure 3:
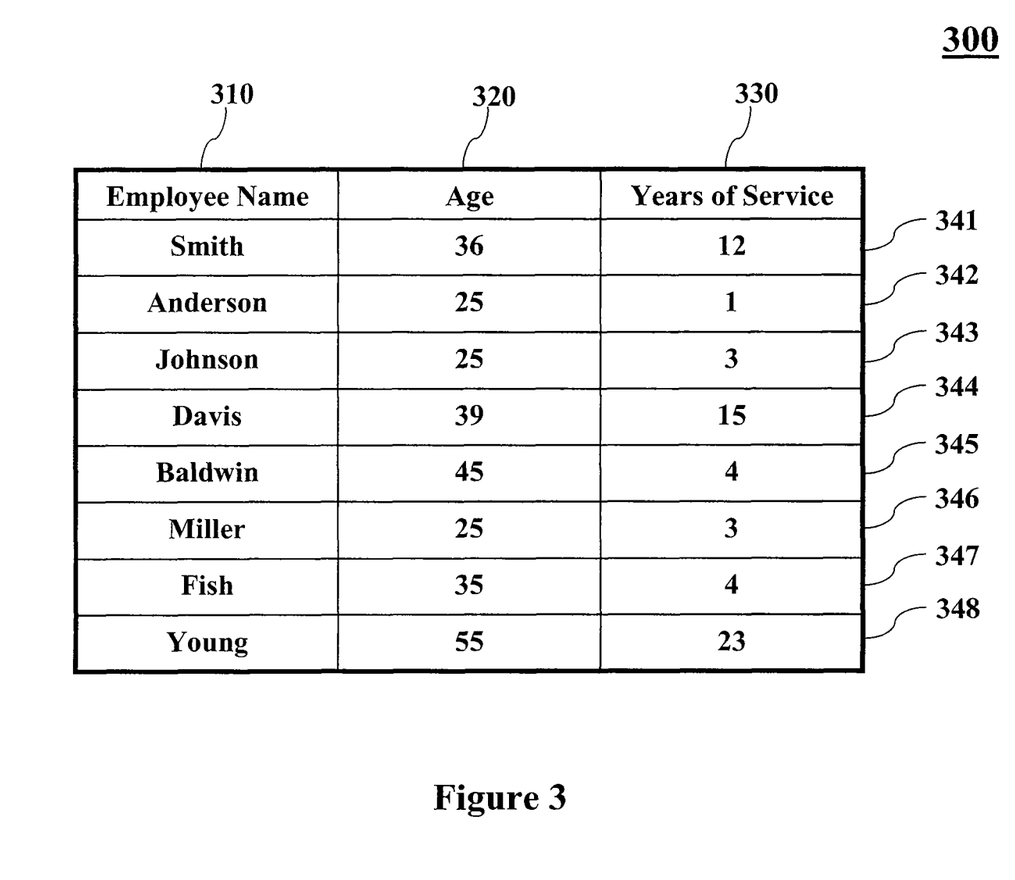
FIG. 3 illustrates a data structure of employees' age and years of service in a table format that is used for exemplary purposes, according to an embodiment.

A local condition is a condition that pertains to a particular table. For instance, as illustrated in FIG. 3, an employee table 300 may contain data for employee information, where columns 310-330 organize data according to departmental information and rows 341-348 contain data entries for columns 310-330. If a query requested data on employees who have over 10 years of service, then the information pertinent to this query would be based on column 330. An operator evaluating values in column 330 greater than 10 would be a local condition for this particular query, where employee table 300 would be searched using this condition. Operators to evaluate values in accordance with a particular condition are known to those skilled in the relevant art. Conversely, if a query requested data on employees in the Engineering Department, then this would not be a local condition for employee table 300 since table 300 does not contain this type of information.

The specific data structures mentioned in the description of method 200, and throughout this application, are given for example purposes only and are not meant to be limiting. Those skilled in the art will recognize other database applications for method 200 based on the description given herein. These other database applications are within the scope and spirit of the present invention.

In step 210, the data structure identifying the set of rows satisfying local conditions for each table within a query is generated prior to the generation of the QEP and prior to the execution of the query. This data structure, by identifying all the specific rows satisfying the local conditions, implicitly contains an exact cardinality of rows to be used in the query execution. In an embodiment, such data structures will generally identify a set of rows for each table in the query that satisfy local conditions on that table, but the query optimizer may provide a cost-basis analysis that precludes the early evaluation of particular kinds of local conditions under certain circumstances. In a preferred embodiment, the data structure would be a bitmap, where each bit in the bitmap set to '1' identifies a relevant row. For example, a bit having a value of '0' may be used to indicate that one or more local conditions are not satisfied for an associated row, and a bit having a value of '1' may be used to indicate that the local conditions are satisfied for the associated row. Conversely, one skilled in the relevant art will appreciate that alternate encodings may also be used. Alternatively, the data structure could be a row identifier list or a set of records extracted from a table containing the relevant rows. Based on the data structure generated in step 210, additional conditions may be inferred in step 220 to help optimize the execution of the query.

Figure 4:
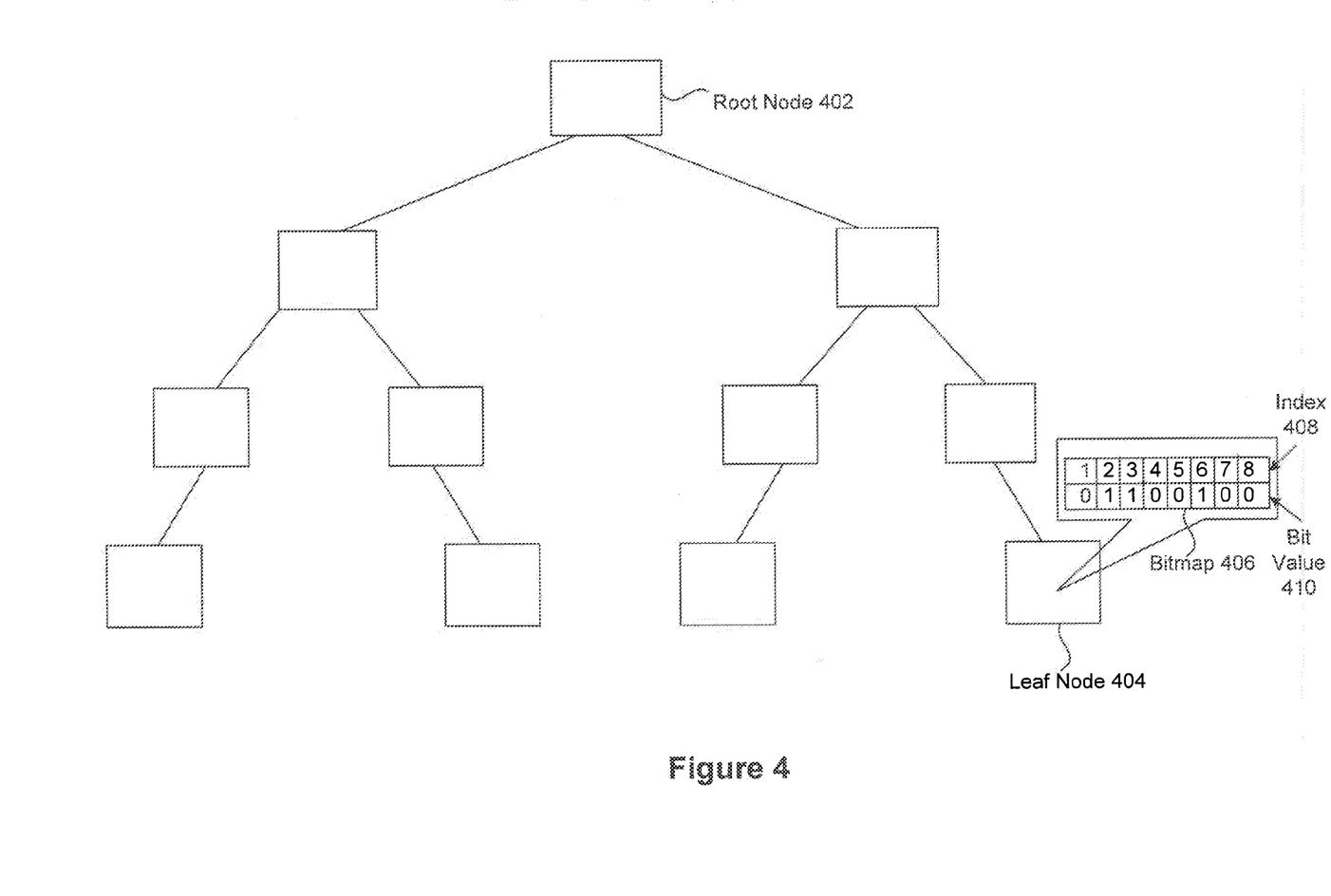
FIG. 4 illustrates a data structure, in a tree format, that may be used as a means of indexing data in a table, used for exemplary purposes, according to an embodiment.

In an embodiment of step 210, a local condition may be evaluated using an index data structure, such as a binary search tree ("BST") 400 illustrated in FIG. 4. Although the data in FIG. 4 may be represented as a BST, one skilled in the relevant art will appreciate that the present invention may be implemented with the use of other types of index structures, including non-tree data structures, and that the invention may be implemented with no index structures by evaluating local conditions directly against rows and/or columns of a table. As such, a person skilled in the relevant art will further recognize that one advantage of the present invention, among other advantages, is that it evaluates local conditions in a manner where a data structure may be created to identify a specific set of rows satisfying a set of local conditions.

BST 400 includes a number of nodes, such as a root node 402 and a leaf node 404, according to an embodiment of the present invention. BST 400 may be traversed by a query processor, such as query processor 108 in FIG. 1, in order to locate a node corresponding to a data value in a query. Each node identifies rows in a database table for which a particular column of that row (i.e., a cell) contains the requested value. For example, in reference to employee table 300 in FIG. 3, if a query processor receives a query for all of the data in each row where the "Age" column (column 320) has a value of "25," the query processor may retrieve a data structure, such as BST 400, corresponding to column 320, and then traverse the data structure in order to locate a node corresponding to the value of "25" in that column. The located node may include information identifying the specific rows in employee table 300 where the value of the "Age" column is "25," thereby eliminating a need for the query processor to traverse each row of employee table 300 in order to compare the entries of column 320.

In an embodiment of the present invention, each node comprises a bitmap 406. Bitmap 406 is a logical array of bits, where each bit of the bitmap may be associated with a row of a table. The individual bits of the bitmap may be toggled between '0' and '1' to indicate whether a particular row meets an equality condition with a value associated with node 404 of bitmap 406, in accordance with an embodiment of the present invention. In common usage, each bit in a bitmap within such an index that is set 'ON' (e.g., a value of '1' rather than '0') indicates a specific row that contains the data value within the associated column; conversely, each bit that is set 'OFF' (e.g., a value of '0') indicates a row that does not contain the data value. In essence, a bitmap is an array of bits, where each array element has a value of '0' or '1.' An implementation of bitmaps below a logical layer (e.g., layer where the data is presented as a bit array) may use more sophisticated data structures than an array to reduce space or computational costs. This form of index, where each distinct value within a column is associated with a bitmap representative of a specific set of rows containing the value, is known those skilled in the relevant art.

In referring to the example with respect to the description of BST 400, if leaf node 404 is associated with the local condition whereby the "Age" column has a value of "25," then bitmap 406 indicates that rows 342, 343, and 346 each have a value of "25" in the cell associated with column 320, in accordance with an embodiment of the present invention. In bitmap 406, index 0 maps to row 341, index 1 maps to row 342, index 2 maps to row 343, and so forth. Accordingly, the query may be rapidly resolved by returning only rows 342, 343, and 346 as a result, without a need to retrieve and compare data in the remaining rows.

In returning to FIG. 2, step 220 modifies a query based on the data structure. With respect to step 220, three cases will be discussed where modification of the query may be based on the following data structures: (1) the data structure identifying exactly one row satisfying the local conditions; (2) the data structure identifying no rows that satisfy the local conditions; and, (3) the data structure identifying a moderate number of rows satisfy the local conditions.

In the case where the data structure identifies exactly one row satisfying the local conditions, for each column in the table that is used elsewhere in the remainder of the query, the cell value for that column from that one row in the table will be projected. The cell value may be projected by retrieving it from a database storage, such as database storage 110 in FIG. 1. Once the relevant cell values for the one row have been projected, then each reference in the query to one of those columns may be replaced by an actual constant cell value. This enables a query processor, such as query processor 108 in FIG. 1, to avoid dragging the column values through query operators.

In the case where the data structure identifies that no rows satisfy the local conditions, then a prefilter condition may be inferred and inserted into the query to indicate an always false condition. It is preferable to migrate such an always false prefilter condition to the highest level in a query operator tree possible. At this level, the always false prefilter condition may be executed first, thus eliminating any subsequent time spent during query processing for any query operators below the prefilter condition's location. These always false prefilter conditions may also be used within the query optimizer to identify portions of the query operator tree where there is no benefit to further optimize the query. For example, computing costs for optimizing a join order for all joins across multiple tables may be avoided whenever an always false prefilter condition appears in a query operator tree above those joins because the prefilter condition will prevent the execution of those joins at run time. In an alternative embodiment, the indication from the data structure identifying no rows satisfy the local conditions may also be used to eliminate the table from the query.

In the case where the data structure identifies that a moderate number of rows satisfy the local conditions. If any of the columns are used within a join condition, then it is possible to infer a new IN condition based on each such join condition. In such cases, these inferred IN conditions may be inserted into the query prior to the generation of the QEP and prior to the execution of the query. Unlike the inferences relating to a data structure identifying exactly one row or no rows satisfying the local conditions, such an inference may not always be beneficial, and therefore the decision to apply the inference will generally be done only after considering the costs and benefits of adding the local condition.

In determining whether to apply inferences to a moderate number of rows in a query execution, a query processor assesses several factors. One of these factors is static environmental conditions of a database server, which includes physical memory in the system, number of CPUs, and cache available for temporary database storage. Another factor considered by the query processor is dynamic environmental conditions, which includes the number of concurrent active users on the server and the portion of temporary cache available to a user. Yet another factor considered by the query processor is cost, which refers to a comparison between a benefit of using an inference for the specific query and the expected computation costs. Additional information on query optimization may be found in a number of publicly available documents, such as M. Astrahan et al., "System R: A Relational Approach to Database Management," ACM Transactions on Database Systems, vol. 1, issue 2, (June 1976), which is herein incorporated by reference in its entirety. Based on the factors above, a query processor determines whether it is optimal for a database server to apply such an inference to a query.

Assuming that a query processor determines that it is beneficial to apply such inferences to a query, additional conditions may be inferred from the moderate number of rows. For example, in referring to example tables 300 and 500 in FIGS. 3 and 5, respectively, a query may request information on employees who are under the age of 30 and who work in the Clerical Department. As illustrated in tables 300 and 500, age information of an employee may be found in employee table 300 and departmental information may be found in organization table 500. Thus, an operator evaluating an age less than 30, typically expressed in the form "AGE <30," is a local condition for employee table 300 and a condition of the form "DEPARTMENT_NAME='Clerical'" is a local condition for organization table 500.

Figure 5:
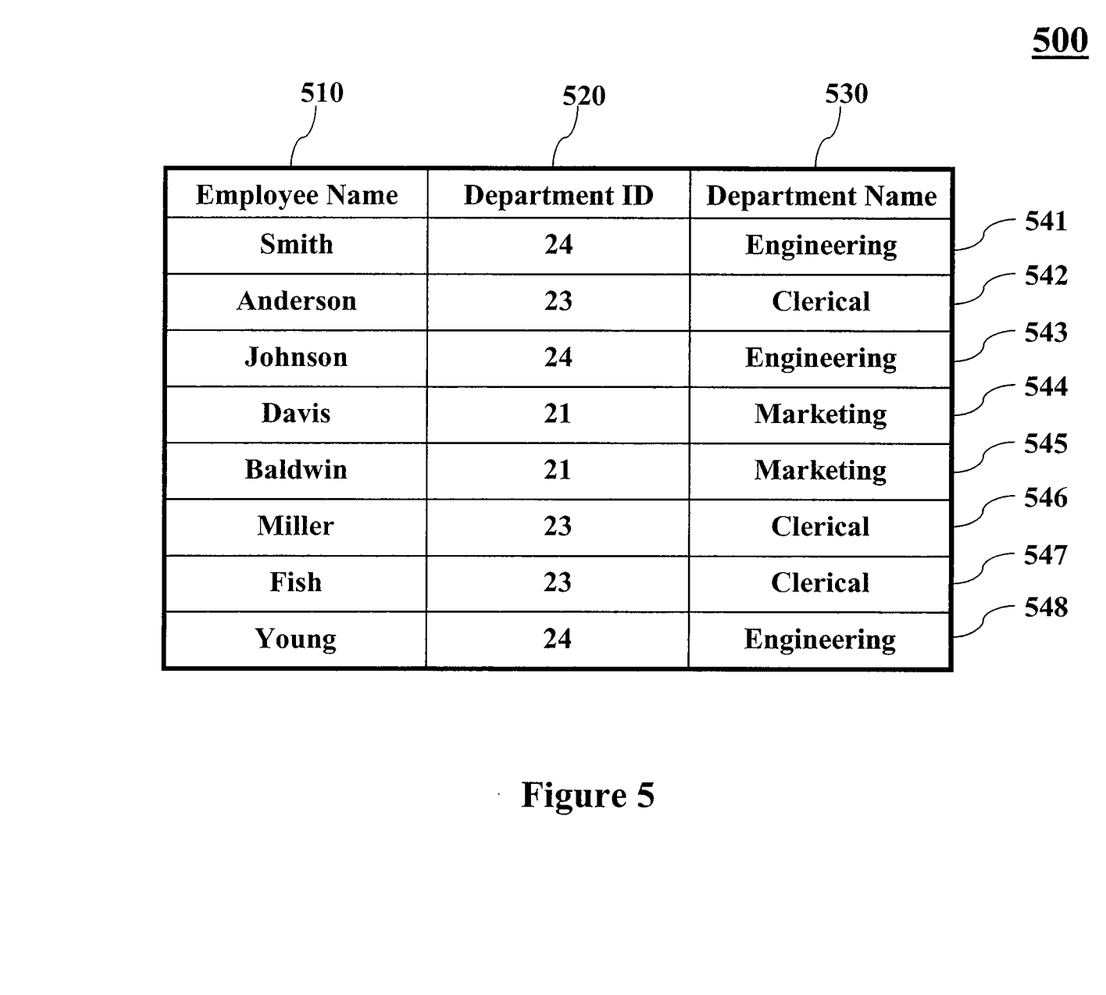
FIG. 5 illustrates a data structure of employees' organization information in a table format that is used for exemplary purposes, according to an embodiment.
Figure 6:
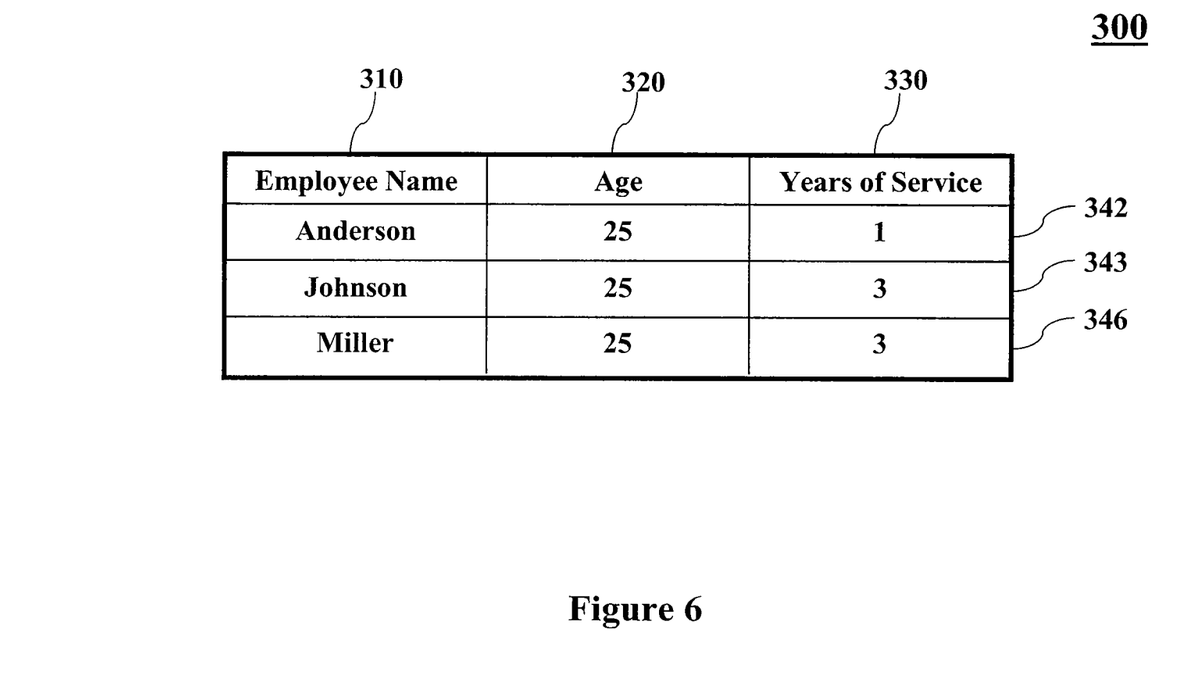
FIG. 6 illustrates a resulting data structure, in table format, that represents the satisfaction of local conditions of an exemplary query, according to an embodiment.

In developing inferences that may be inserted into a query prior to the generation of a QEP, a query processor applying step 210 will first determine the rows in employee table 300 that meet the local condition. Rows 342-343 and 346 satisfy the local condition, as illustrated in FIG. 6. From this information, the query processor may infer that three particular employees satisfy the local condition on age, specifically "Anderson," "Johnson," and "Miller." Assuming this query also contains a join condition of the form "EMPLOYEE.EMPLOYEE_NAME=ORGANIZATION. EMPLOYEE_NAME," then these employee names may be used to infer an IN condition against organization table 500 of the form "ORGANIZATION.EMPLOYEE_NAME IN ('Anderson', 'Johnson', 'Miller')." Similarly, the Clerical department local condition on organization table 500 will be satisfied by rows 542, 546, and 547 where the relevant names are "Anderson," "Miller," and "Fish." A condition of the form "ORGANIZATION.EMPLOYEE_NAME IN ('Anderson', 'Miller', 'Fish')" may also be inferred. Since both of these conditions are local to a single table, then they may also be evaluated prior to the generation of the QEP, and if this is done, the query optimizer may assess that exactly two rows from each of these tables will be relevant to the query, specifically organization rows 542 and 546 and employee rows 342 and 346 that correspond to employees "Anderson" and "Miller." Based on these inferences, the number of rows processed by each table during query execution is reduced. A person skilled in the relevant art will appreciate that the example described above may occur by satisfying multiple local conditions for organization table 500 and developing inferences from table 500; similarly, this may also occur using employee table 300.

In returning to FIG. 2, step 230 assesses whether additional local conditions are created from step 220 and if so, steps 210 and 220 may be repeated, if appropriate. Under some circumstances, step 220 may result in a creation of additional local conditions. For example, if a query contains a condition on employee table 300 of the form "EMPLOYEE.YEARS_OF_SERVICE=3," then an evaluation of that condition would identify only row 346 as relevant to the query, and therefore, the only relevant value of EMPLOYEE_NAME value is 'Miller.' In such case, all remaining references to EMPLOYEE_NAME may be replaced by a constant value 'Miller,' thereby avoiding any subsequent query processing costs associated with storing or propagating that value within the QEP. If the query also referred to an organization table 500, within a condition of the form "EMPLOYEE.EMPLOYEE_NAME=ORGANIZATION.EMPLOYEE_NAME," then the process of replacing columns with their constant values will indirectly result in an inference of a new local condition of the form "ORGANIZATION. EMPLOYEE_NAME='Miller'." One skilled in the relevant art will appreciate that the description above is equally applicable to a situation where two or more local conditions are satisfied by only one row in a table.

Further, if any additional conditions are created from step 220, then more conditions may be inferred from the set of existing conditions by applying common industry methods, such as transitive closure. These common methods are known to those skilled in the relevant art and described in M. Strahan's paper on "System R: A Relational Approach to Database Management" (referenced above), which is herein incorporated by reference in its entirety.

In step 230, if any additional local conditions are created, then method 200 is repeated, if appropriate, by returning to step 210 to evaluate new local conditions prior to generating the QEP for the query. This iterative process may be repeated until either no conditions may be inferred or until no additional conditions may be inferred with respect to a cost analysis of the local condition (e.g., whether it is beneficial to apply the local condition). If the iterative process is not repeated, then method 200 concludes in step 240.

Figure 7:
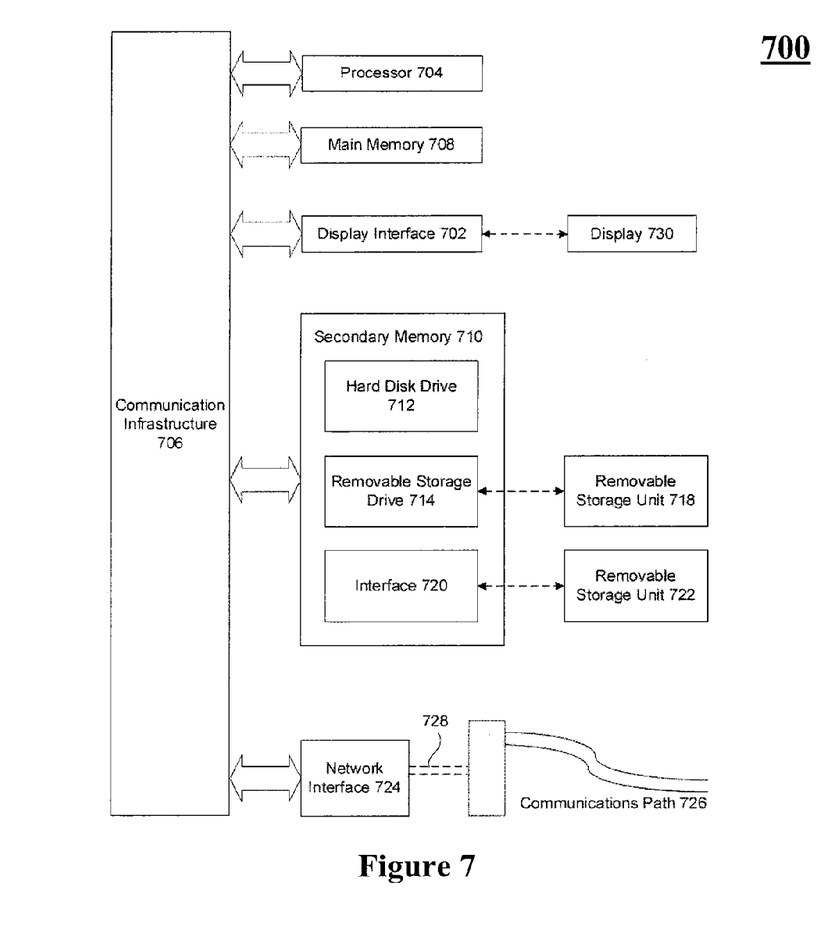
FIG. 7 illustrates an embodiment of a computer system in which the present invention may be implemented.

Various aspects of the present invention may be implemented by software, firmware, hardware, or a combination thereof. FIG. 7 illustrates an example computer system 700 in which the present invention, or portions thereof, can be implemented as computer-readable code. For example, the methods illustrated by flowchart 200 of FIG. 2 may be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 may be a special purpose or a general purpose processor. Processor 704 is connected to a communication infrastructure 706 (e.g., a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art, removable storage unit 718 includes a computer-usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as those found in video game devices), a removable memory chip (e.g., EPROM or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, a RF link or other communications channels. As illustrated in FIG. 7, computer system 700 also includes a display interface 702 and display 730.

In this document, the terms "computer program medium" and "computer-usable medium" are used to generally refer to media such as removable storage unit 718, removable storage unit 722, and a hard disk installed in hard disk drive 712. Signals carried over communications path 726 can also embody the logic described herein. Computer program medium and computer-usable medium can also refer to memories, such as main memory 708 and secondary memory 710, which can be memory semiconductors (e.g., DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the steps in the methods illustrated by flowchart 200 of FIG. 2, discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer program products comprising software stored on any computer-usable medium. Such software, when executed in one or more data processing device, causes a data processing device(s) to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method in a database system, comprising:
identifying a set of rows that satisfy local conditions to a table prior to an execution of a query;
generating a data structure based on an actual effect of the local conditions on the table comprising one or more bits, each bit representing a row in the set of identified rows, a value of each bit indicating whether its respective row satisfies the local conditions to the table;
modifying the query based on the generated data structure, wherein the modifying comprises identifying a quantity of rows that satisfy the local conditions by:
identifying whether there are no rows that satisfy the local conditions in the data structure;
identifying whether there is exactly one row that satisfies the local conditions for contents of cell values in the exactly one row in the data structure; and
identifying whether there are a moderate number of rows that satisfy the local conditions for contents of cell values in the moderate number of rows in the data structure, and wherein the modifying further comprises modifying the query based on the identifying the quantity of rows; and
processing the modified query to generate an execution plan for the query.

2. The method of claim 1, further comprising:
repeating the generating and the modifying, when one or more additional local conditions are inferred from the modifying, until no additional local conditions are inferred or until no additional local conditions are inferred with respect to a computational cost of evaluating the local condition.

3. The method of claim 1, wherein the generating comprises using indexes or cell values of the table during an evaluation of local conditions.

4. The method of claim 1, wherein the identifying no rows comprises inferring a false prefilter condition, which is migrated to a highest level of a query operator tree of the query.

5. The method of claim 1, wherein the identifying no rows comprises an elimination of the table from the query.

6. The method of claim 1, wherein the identifying exactly one row comprises replacing occurrences of columns from the table with contents of corresponding cell values.

7. The method of claim 1, wherein the identifying a moderate number of rows comprises inferring an IN condition when a column from the table is used within a join condition.

8. An article of manufacture including a non-transitory computer-readable storage medium having instructions stored thereon that, when executed by a processing device, cause the processing device to perform operations comprising:
identifying a set of rows that satisfy local conditions to a table prior to an execution of a query;
generating a data structure based on an actual effect of the local conditions on the table comprising one or more bits, each bit representing a row in the set of identified rows, a value of each bit indicating whether its respective row satisfies the local conditions to the table;
modifying the query based on the generated data structure; and
processing the modified query to generate an execution plan for the query,
wherein the modifying comprises identifying a quantity of rows that satisfy the local conditions by:
identifying whether there are no rows that satisfy the local conditions in the data structure;
identifying whether there are exactly one row that satisfies the local conditions for contents of cell values in the exactly one row in the data structure; and
identifying whether there are a moderate number of rows that satisfy the local conditions for contents of cell values in the moderate number of rows in the data structure,
and wherein the modifying further comprises modifying the query based on the identifying the quantity of rows.

9. The article of manufacture of claim 8, the operations further comprising:
repeating the generating and the modifying when one or more additional local conditions are inferred from the modifying, until no additional local conditions are inferred or until no additional local conditions are inferred with respect to a computational cost of evaluating the local condition.

10. The article of manufacture of claim 8, the generating further comprising:
using indexes or cell values of the table during an evaluation of the local conditions.

11. The article of manufacture of claim 8, the identifying no rows further comprising:
inferring a false prefilter condition, which is migrated to a highest level of a query operator tree of the query.

12. The article of manufacture of claim 8, the identifying exactly one row further comprising:
replacing occurrences of columns from the table with contents of corresponding cell values.

13. The article of manufacture of claim 8, the identifying the moderate number of rows further comprising:
inferring an IN condition when a column from the table is used within a join condition.

14. A processor-based database system, comprising:
a memory configured to store modules comprising:
- a first module configured to identify a set of rows that satisfy local conditions to a table prior to an execution of a query;
- a second module configured to generate a data structure based on an actual effect of the local conditions on the table comprising one or more bits, each bit representing a row in the set of identified rows, a value of each bit indicating whether its respective row satisfies the local conditions to the table;
- a third module configured to modify the query based on the generated data structure, wherein the third module is further configured to identify a quantity of rows that satisfy the local conditions by:
  - a module operable to identify whether there are no rows that satisfy the local conditions in the data structure;
  - a module operable to identify whether there is exactly one row that satisfies the local conditions for contents of cell values in the exactly one row in the data structure; and
  - a module operable to identify whether there are a moderate number of rows that satisfy the local conditions for contents of cell values in the moderate number of rows in the data structure
- and wherein the third module is further configured to modify the query based on the identifying the quantity of rows; and
- a fourth module configured to process the modified query to generate an execution plan for the query,
- wherein the first module, the second module, the third module and the fourth module are implemented on one or more processors of the system.

15. The processor-based database system of claim 14, further comprising:
- a fifth module configured to re-generate the data structure and re-modify the query, when one or more additional local conditions are inferred from the modification of the query, until no additional local conditions are inferred or until no additional local conditions are inferred with respect to a computational cost of evaluating the local condition.

16. The processor-based database system of claim 14, wherein the second module comprises:
- a module operable to use indexes or cell values of the table during an evaluation of local conditions.

17. The processor-based database system of claim 14, wherein identifying no rows module comprises:
- a module operable to infer a raise prefilter condition, which is migrated to a highest level of a query operator tree of the query.

18. The system processor-based database of claim 14, wherein the identifying exactly one row module comprises:
- a module operable to replace occurrences of columns from the table with contents of corresponding ceil values.

19. The processor-based database system of claim 14, wherein the identifying the moderate number of rows module comprises:
- a module operable to infer an IN condition when a column from the table is used with a join condition.

* * * * *